July 19, 1966      A. HALPERT      3,261,471
AQUARIUM FILTER SYSTEM
Filed May 23, 1962
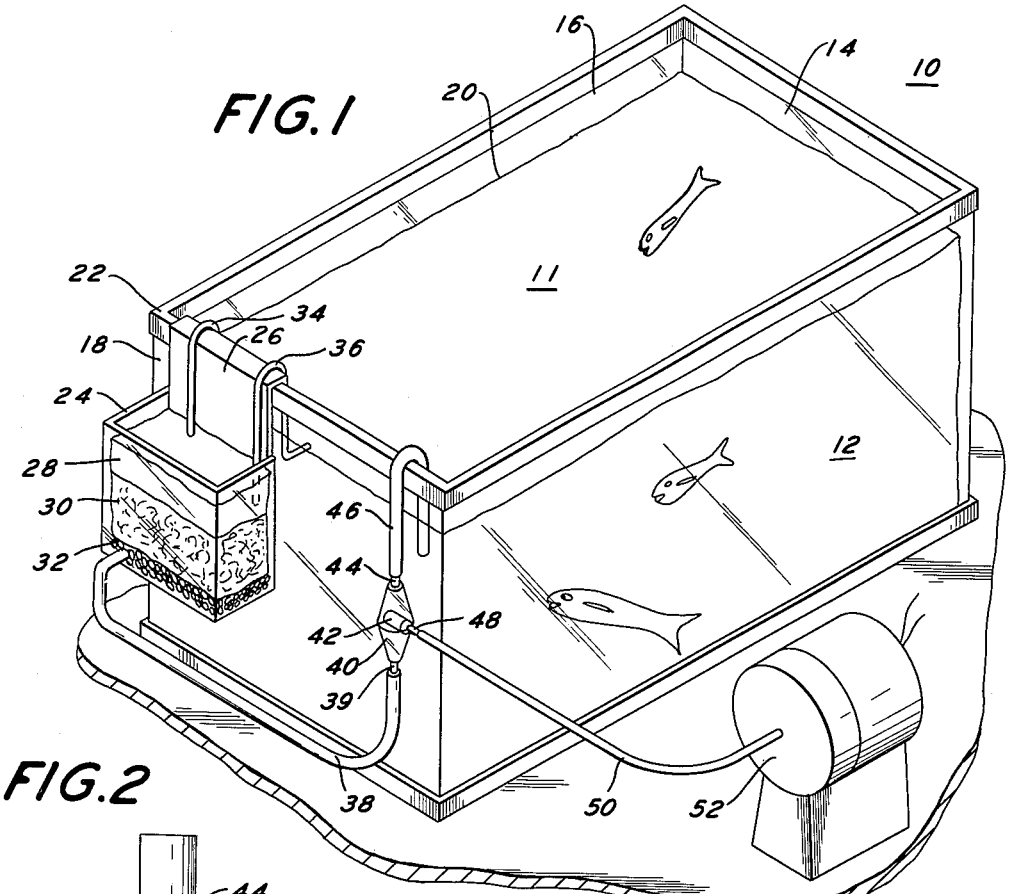
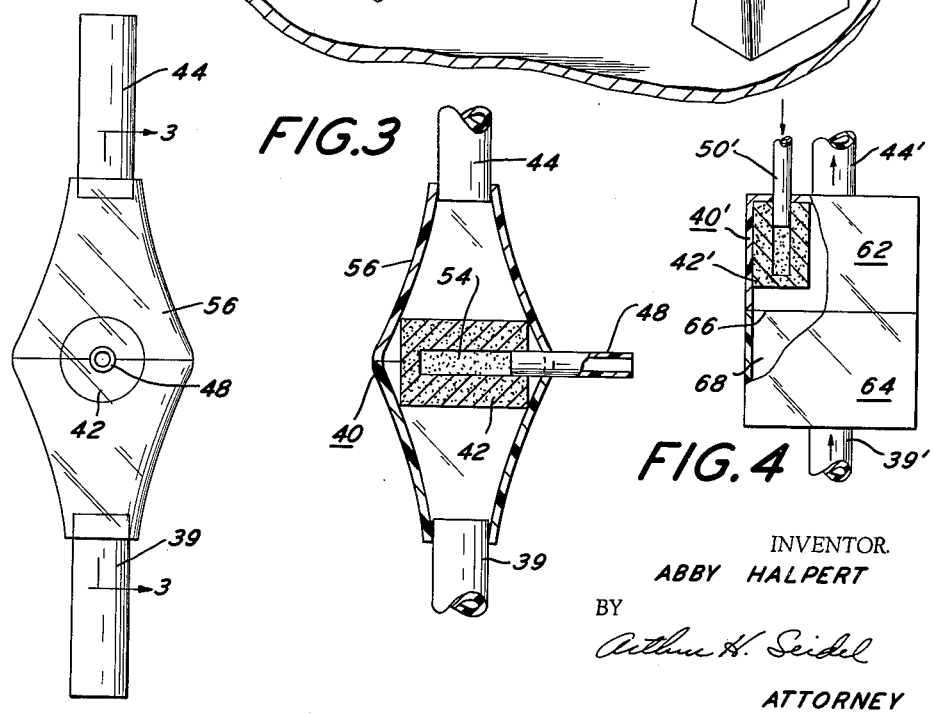
INVENTOR.
ABBY HALPERT
BY
Arthur H. Seidel
ATTORNEY

3,261,471
AQUARIUM FILTER SYSTEM
Abby Halpert, Brooklyn, N.Y., assignor to Halvin Products Company, Inc., Brooklyn, N.Y., a corporation of New York
Filed May 23, 1962, Ser. No. 197,008
1 Claim. (Cl. 210—169)

In general, this invention relates to a new water aeration and filtration system for aquariums. More particularly, it relates to an aeration and filtration system for an aquarium which may be placed wholly on the outside of the aquarium.

In the past, the owner of a home aquarium would place either the filter or the aerator in the aquarium water. The aerator, in particular, was usually placed on the bottom of the aquarium so as to distribute air bubbles uniformly throughout the water. However, the aerator took up space in the tank which might better have been utilized. The space around the aerator was avoided by the fish who were continually startled by the aerator action in the water.

In order to overcome the foregoing and other difficulties of the prior art, the general object of this invention is to provide a new and better aquarium filtration system.

Another object is to provide a better water filtration and aeration system for an aquarium in which the working elements of the system are wholly outside of the tank.

Another object of the invention is to provide a new aeration system for an aquarium in which an air stone is placed in the siphon connector exterior of the tank.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a perspective view of a system incorporating the features of the present invention.

FIGURE 2 is an end view of an air stone connector utilizing the principles of the present invention.

FIGURE 3 is a cross sectional view taken along lines 3—3 of FIGURE 2.

FIGURE 4 is an elevation view of another embodiment of the air stone connector, with a portion broken away for purposes of illustration.

In the drawings, like numerals indicate like elements.

In FIGURE 1, an aquarium 10 consists of a tank 11 made of a transparent material such as glass. The tank 11 has side walls 12, 14, 16 and 18. The tank 11 is filled with water 20 and fish or other marine life are placed in the tank.

Side wall 18 has a top edge 22 on which is placed a filter container 24. The filter container 24 has a mounting bracket 26 which holds the filter container 24 in place over the edge 22 of the tank 11.

The filter container 24 has a layer of glass wool 28 and a layer of charcoal 30 therein to filter the water 20 from the tank. The glass wool layer 28 and the charcoal layer 30 are placed on a perforated platform 32 which separates the filtering layers from the bottom of the filter container 24. A conventional overflow tube 34 is connected over the edge 22 of wall 18 between the filter container 24 and the water 20. A siphon tube 36 is also connected between the water 20 and the filter container 24. The siphon tube 36 passes over the bracket 26.

A tube 38 is connected between the bottom of the filter container 24 and the water inlet 39 of an air stone connector 40. The air stone connector 40 has an air stone 42 centrally located within the connector 40. The outlet 44 of the connector 40 is attached to a tube 46 which passes over an edge of the tank 11 into the water 20. An air inlet port 48 is spaced on one side wall of the connector 40 so as to achieve access to the interior of the air stone 42. A conduit 50 is attached between the air inlet 48 and a pump 52. An air stone has the property of being porous to air and impervious to water.

The construction of the connector 40 is better shown in FIGURES 2 and 3. The air stone 42 is made of a hard foraminous substance such as a porous stone. The air stone 42 is cup-shaped and has an interior portion 54 which receives the air inlet tube 48. Air forced by pump 52 through conduit 50 into the inlet tube 48 will pass in very tiny bubbles through the surface of the air stone 42. The air stone 42 is held in place by the expanded walls 56 of the connector 40. The walls 56 are shaped to hold the air stone 42 rigidly in place. The walls 56 comprise two substantially frusto-conical sections having their bases joined in abutting relationship.

The operation of the aquarium 10 is as follows:

In the beginning, water in the tubes 36 and 46 and the filter container 24 is at the level of the water 20 in the tank 11. When the pump 52 is turned on, it forces air through conduit 50 into the interior portion 54 of the air stone 42. This air is dispersed in minute bubbles into the water in the connector 40. The air bubbles rise through the outlet tube 44 into the conduit 46. The air bubbles displace the water in the conduit 46 forcing the water upward and over the edge of the tank 11 and back into the water 20. As water is forced from the outlet tube 46, the water in conduit 38 and filter container 24 tends to take its place. This decreases the water level in the container 24 and the end of the siphon tube 36 in the filter container 24. The water in the other end of the siphon tube 36 is forced through the siphon tube 36 over the edge 22 of the wall 18 back into the filter container 24. When this occurs, the entire siphoning system including tube 36, filter container 24, tube 38, connector 40, and tube 46 is filled with water. This water is being continuously moved from the main body of water 20 through the filters 28 and 30 and the connector 40 back into the main body 20.

During this process, the water is filtered by the glass wool layer 28 and the charcoal layer 30, and is aerated by the bubbles passing through the air stone 42. Since the bubbles from the air stone act on a small volume of water at any given time, the water is better aerated and forced at a more rapid rate than would be possible if no air stone was inserted in the connector 40. This rapid aeration is due in great measure to the size of the air bubbles emanating from the air stone 42.

In FIGURE 4 there is disclosed another embodiment of an air stone connector designated as 40'. Connector 40' is cylindrical in cross section and comprises a transparent plastic upper half 62 connected to a transparent plastic lower half 64 by transparent adhesive 66 to form a cylindrical chamber 68. An air stone 42', identical with stone 42, is rigidly supported in chamber 68 and is adapted to be connected to pump 52 by conduit 50'. Connector 40' is provided with an inlet 39' and an outlet 44'. In view of the above description, it is not deemed necessary to explain the operation of connector 40' in detail.

It will be recognized that the objects of the invention have been achieved by providing a new and novel aeration and filtration system which is wholly on the outside of the aquarium tank. The aeration and filtration achieved by the present invention are more rapid and more complete than in the prior art.

The present invention may be embodied in other specific forms without departing from the spirit or essential attributes thereof and, accordingly, reference should be

I claim:

An aquarium filtration and aeration system for use with a tank of water, a filter to be mounted on said tank with at least a portion of said filter being below the level of the water in said tank, said filter including inlet and outlet means, first conduit means for connection between the water in said tank and the inlet means of said filter, said first conduit being a siphon and having a central portion for extension above the level of the water in said tank, a second conduit means for connection between said filter outlet means and the water in said tank, said second conduit including a central portion for extension above the level of the water in said tank, a transparent axially vertically disposed connector device in said second conduit for connecting said second conduit to air pressure supply means, said connector device being positioned in said second conduit between said second conduit central portion and said filter, whereby said connector device is adapted to be located outside of said tank, said connector device defining a chamber therein and a top and bottom end, said device being formed of opposed substantially frusto-conical sections and having an inlet at the bottom and an outlet at the top end, said inlet and outlet being axially aligned and in direct comcomunication with said chamber, said chamber being radially enlarged with respect to said inlet and outlet, a porous air stone rigidly supported by and within said chamber, the volume of said stone being substantially less than one-half the volume of said chamber, said air stone having a blind cavity extending from a surface thereof, said device having an opening in a vertical wall thereof in line with said cavity, a third conduit extending through said opening and extending partially into said cavity, the end portion of said third conduit partially extending into said cavity being spaced from the blind end of said cavity, said third conduit being smaller in cross section than each of said inlet and outlet, and said third conduit being adapted to be connected to said air pressure means, whereby pressurized air may be introduced into the air stone cavity and pass therethrough into the chamber for removal through said outlet.

References Cited by the Examiner

UNITED STATES PATENTS

| | | | |
|---|---|---|---|
| 2,676,921 | 4/1954 | Vansteenkiste | 210—169 |
| 2,729,337 | 1/1956 | Alferman | 210—169 X |
| 2,730,496 | 1/1956 | Zavod | 210—169 |
| 2,737,490 | 3/1956 | Lambertson | 210—169 |
| 2,783,893 | 3/1957 | Romanoff | 210—169 X |
| 2,786,026 | 3/1957 | Stark | 210—169 |
| 2,877,898 | 3/1959 | Lacey | 210—169 |
| 3,135,238 | 6/1964 | Eyl | 210—169 X |

FOREIGN PATENTS 839,574    5/1952    Germany.

REUBEN FRIEDMAN, *Primary Examiner.*

HERBERT L. MARTIN, *Examiner.*

F. W. MEDLEY, C. R. REAP, *Assistant Examiners.*